United States Patent
Lin et al.

(10) Patent No.: US 6,881,797 B2
(45) Date of Patent: Apr. 19, 2005

(54) PROCESS FOR HYDROGENATION OF CONJUGATED DIENE POLYMER

(75) Inventors: Fu Lin, Kaohsiung (TW); Chih-Kuang Tsai, Kaohsiung (TW); Shun-An Liu, Kaohsiung (TW)

(73) Assignee: TSRC Corporation, Kaohsiung (TW)

( * ) Notice: Subject to any disclaimer, the term of this patent is extended or adjusted under 35 U.S.C. 154(b) by 78 days.

(21) Appl. No.: 10/394,456

(22) Filed: Mar. 21, 2003

(65) Prior Publication Data

US 2004/0082727 A1 Apr. 29, 2004

(30) Foreign Application Priority Data

Oct. 25, 2002 (TW) ......................................... 91125229 A (51) Int. Cl.$^7$ ................................................. C08F 8/42
(52) U.S. Cl. ................ 525/338; 525/332.8; 525/332.9; 525/333.1; 525/333.2; 525/339; 525/331.9
(58) Field of Search ............................... 525/338, 332.8, 525/332.9, 333.1, 333.2, 339, 331.9

(56) References Cited

U.S. PATENT DOCUMENTS

| | | | |
|---|---|---|---|
| 4,980,421 A | * | 12/1990 | Teramoto et al. ............ 525/338 |
| 5,886,108 A | | 3/1999 | Miyamoto et al. .......... 525/338 |
| 5,948,869 A | | 9/1999 | Vallieri et al. .............. 525/940 |

FOREIGN PATENT DOCUMENTS

| | | | |
|---|---|---|---|
| EP | 0 544 304 A1 | 6/1993 | |
| EP | 0 434 469 B1 | 2/1995 | ........... C08C/19/02 |
| EP | 0 914 867 A1 | * 5/1999 | |

* cited by examiner

*Primary Examiner*—Ling-Sui Choi
(74) *Attorney, Agent, or Firm*—Fish & Richardson P.C.

(57) ABSTRACT

A process for hydrogenation of a conjugated diene polymer. The conjugated diene polymer in an inert organic solvent is brought into contact with hydrogen in the presence of a hydrogenation catalyst composition to selectively hydrogenate the unsaturated double bonds in the conjugated diene units of the conjugated diene polymer. The hydrogenation catalyst composition includes: (I) a titanium compound; (II) a compound represented by formula (II):

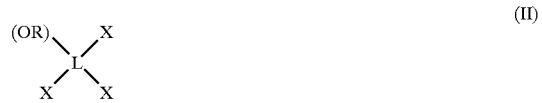

(II)

wherein L is a Group IVB element, R is $C_1$–$C_{12}$ alkyl or $C_1$–$C_{12}$ cycloalkyl, X can be the same or different and is $C_1$–$C_{12}$ alkyl, $C_1$–$C_{12}$ alkoxy, $C_1$–$C_{12}$ cycloalkoxy, halogen, or carbonyl; and (III) a trialkylaluminum compound.

24 Claims, 2 Drawing Sheets

PROCESS FOR HYDROGENATION OF CONJUGATED DIENE POLYMER

CROSS REFERENCE TO RELATED APPLICATIONS

Pursuant to 35 USC § 119, this application claims the benefit of Taiwan Patent Application No. 91125229 filed Oct. 25, 2002.

BACKGROUND OF THE INVENTION

1. Field of the Invention

The present invention relates to a process for hydrogenation of a conjugated diene polymer, and more particularly to a process for hydrogenation of a conjugated diene polymer using a special catalyst composition.

2. Description of the Prior Art

Generally, polymers obtained by polymerizing or copolymerizing conjugated dienes are widely utilized for commercial purposes. These polymers have residual unsaturated double bonds in their polymer chains. These unsaturated double bonds are advantageously utilized for vulcanization and yet have a disadvantage in that they lack the stability to resist weather conditions, oxidation and ozone due to the presence of a large amount of unsaturated double bonds. Such disadvantage is more severe for block copolymers of conjugated dienes and vinyl aromatic hydrocarbons used as thermoplastic elastomers. Such disadvantage is even more severe when the block copolymers of conjugated dienes and vinyl aromatic hydrocarbons are used as modifiers and transparent impact-resistant materials for styrenic resins and olefinic resins. In the field of exterior materials to which such properties are indispensable, therefore, the block copolymers find limited utility because of this drawback.

This deficiency in stability can be notably improved by hydrogenating such conjugated diene polymers and consequently eliminating the unsaturated double bonds persisting in the polymer chain thereof. Numerous methods have been so far proposed for hydrogenating conjugated diene polymers in the presence of suitable and effective hydrogenation catalysts. Typical hydrogenation catalysts can be classified into two types:

(1) heterogeneous catalysts having compounds of nickel, platinum, or palladium deposited on supports such as active carbon, silica, alumina, or calcium carbonate;

(2) homogeneous catalysts, for example, Ziegler-type catalysts obtained by causing an organic acid salt of nickel, cobalt, iron, or chromium to react with a reducing agent such as an organic aluminum compound, and organometallic compounds such as Ru, Rh, Ti, or La compound.

Although widely used in industry, heterogeneous catalysts have lower activity than the homogeneous catalyst. Therefore, it requires a large amount of heterogeneous catalyst and the hydrogenation must be conducted at higher temperature and pressure. In contrast, less homogeneous catalyst is needed and the hydrogenation can be conducted at mild temperature and pressure.

Hydrogenation using a heterogeneous catalyst is described as follows. First, the polymer to be hydrogenated is dissolved in a suitable solvent. Then, the polymer is brought into contact with hydrogen in the presence of a heterogeneous catalyst. When the polymer is hydrogenated, contact between the polymer and the catalyst is difficult because of the influence of the viscosity of the reaction system and the influence of stereohindrance of the polymer. Moreover, the hydrogenation requires higher temperature and pressure, and hence, decomposition of the polymer and the gelation of the reaction system tend to occur. Also, in the hydrogenation of a copolymer of a conjugated diene with a vinyl aromatic hydrocarbon, even hydrogenation of the aromatic ring portion takes place due to high temperature and pressure and it has been difficult to selectively hydrogenate only the double bonds in the conjugated diene portion. In addition, since the polymer is strongly adsorbed on the heterogeneous catalyst, it is impossible to completely remove the catalyst from the hydrogenated polymer solution.

On the other hand, with the homogeneous catalyst, the hydrogenation proceeds normally in a homogeneous system. Therefore, compared with the heterogeneous catalyst, the homogeneous catalyst is generally high in activity and a small amount of catalyst enables a satisfactory hydrogenation to be effected at low temperature and low pressure. In addition, when appropriate hydrogenation conditions are selected, it is possible to preferentially hydrogenate the conjugated diene portion of a copolymer of a conjugated diene with a vinyl aromatic hydrocarbon, while not hydrogenating the aromatic ring portion.

Conventional processes for hydrogenation of a conjugated diene polymer using a homogeneous catalyst are summarized below.

U.S. Pat. No. 4,980,421 discloses a process for hydrogenating a conjugated diene polymer using a hydrogenation catalyst including a bis(cyclopentadienyl)titanium(+4) compound, an alkoxy lithium compound, and an organometallic compound (such as aluminum, zinc, or magnesium compound). This hydrogenation catalyst has high activity and can be used under mild conditions.

U.S. Pat. No. 5,270,274 discloses a hydrogenation catalyst composition including a bis(cyclopentadienyl)titanium(+4) compound, a polarized carbonyl group or epoxy group-containing compound, and an organic lithium compound. The unsaturated double bonds in the conjugated diene polymer can be preferentially hydrogenated. The hydrogenated polymer has superior physical properties and weather resistance.

U.S. Pat. No. 5,244,980 discloses a hydrogenation process including terminating a living conjugated diene polymer with hydrogen, and then adding an organo alkali metal and a Tebbe's catalyst.

U.S. Pat. No. 5,886,108 discloses hydrogenating a living conjugated diene polymer using a Tebbe's catalyst prepared by the reaction of a bis(cyclopentadienyl)titanium(+4) compound and trimethyl aluminum.

U.S. Pat. No. 5,985,995 discloses a process for producing a hydrogenated rubber, which allows an easy and effective deactivation of the living polymer before the hydrogenation step. The deactivation of living polymer is carried out using alkyl silicon halide or alkyl tin halide. The catalyst used in the hydrogenation of the deactivated polymer can be bis(cyclopentadienyl)Ti(PhOCH$_3$)$_2$.

U.S. Pat. No. 5,948,869 discloses a catalyst composition effective in the selective hydrogenation of conjugated diene polymer, which includes a bis(cyclopentadienyl) titanium(+4) compound, an alkyl zinc or alkyl magnesium, and a modifier of ethers or aromatic hydrocarbon compounds.

European Patent No. 0434469 A2 discloses a catalyst composition for hydrogenating a conjugated diene polymer, which includes a bis(cyclopentadienyl)titanium compound, an organoaluminum compound or organomagesium compound, and a polar compound of ether or ketone.

European Patent No. 0544304A discloses a catalyst composition including a bis(cyclopentadienyl) transition metal compound, a polarized compound of carbonyl group-containing compound or epoxy group-containing compound, an organic lithium compound, and a reducing organometal compound such as aluminum compound, zinc compound, or magnesium compound, for example, triethyl aluminum.

Although various catalyst compositions have been developed to hydrogenate the conjugated diene polymer, there is still a need to develop a new catalyst composition for hydrogenation of conjugated diene polymers.

SUMMARY OF THE INVENTION

Accordingly, an object of the present invention is to provide a process for successful hydrogenation of a conjugated diene polymer using a small amount of a hydrogenation catalyst composition with relatively high activity. Since the catalyst concentration is very low, there is no need to remove the catalyst from the hydrogenated polymer, which greatly enhances economical efficiency. Moreover, the hydrogenation of the present invention is very rapid and exhibits good reproducibility over a wide range of temperatures and pressures.

Another object of the present invention is to provide a stable and easy-to-store catalyst composition. The catalyst (II) itself has the ability to hydrogenate the conjugated diene polymer. In addition, the catalyst (II) can combine with other catalysts to increase the overall hydrogenation efficiency and stabilize the activity of other catalysts. Therefore, when the catalyst composition of the present invention is added to the conjugated diene polymer, it can be stored for a long period of time and maintains good catalytic activity stability and reproducibility.

To achieve the objects mentioned above, the present process for hydrogenation of a conjugated diene polymer includes the following step. The conjugated diene polymer in an inert organic solvent is brought into contact with hydrogen in the presence of a hydrogenation catalyst composition to selectively hydrogenate the unsaturated double bonds in the conjugated diene units of the conjugated diene polymer. The hydrogenation catalyst composition includes the following hydrogenation catalysts:

(I) a titanium compound represented by formula (I):

(I)

wherein $R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2$, —$CH_2Si(C_1$–$C_5$ alkyl$)_3$ or —$P(phenyl)_2$, Cp* indicates cyclopendienyl, indenyl, fluorenyl, or derivatives thereof;

(II) a compound represented by formula (II):

(II)

wherein

L is a Group IVB element,

R is $C_1$–$C_{12}$ alkyl or $C_1$–$C_{12}$ cycloalkyl,

X can be the same or different and is $C_1$–$C_{12}$ alkyl, $C_1$–$C_{12}$ alkoxy, $C_1$–$C_{12}$ cycloalkoxy, halogen, or carbonyl; and (III) a trialkylaluminum compound represented by formula (III):

(III)

wherein R can be the same or different and is $C_1$–$C_{12}$ alkyl or $C_6$–$C_{12}$ aryl, The molar ratio of the hydrogenation catalyst (II) to the hydrogenation catalyst (I) is 0.1 to 50, and the molar ratio of the hydrogenation catalyst (III) to the hydrogenation catalyst (I) is 0.1 to 50. The hydrogenation catalyst (I) is present in an amount of 0.0001 to 50 mmole based on 100 g of the conjugated diene polymer. The hydrogenation reaction is conducted at a temperature of 0° C. to 200° C. at a hydrogen pressure of 0.1 kg/cm² to 100 kg/cm².

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The hydrogenation catalyst (I) of the present invention is a titanium compound represented by formula (I):

(I)

wherein $R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2$, —$CH_2Si(C_1$–$C_5$ alkyl$)_3$ or —$P(phenyl)_2$, and

Cp* indicates cyclopendienyl, indenyl, fluorenyl, or derivatives thereof.

For example, Cp* can be $C_5(R')_5$, wherein R' can be the same or different and is hydrogen, halogen, alkyl, hydrocarbylaryl, or aryl.

Hydrogenation catalyst (I) suitable for use in the present invention can be bis(cyclopentadienyl)titanium dichloride, bis(1-fluorenyl)titanium dichloride, bis(1-indenyl)titanium dichloride, bis(1-fluorenyl)titanium dibromide, bis(1-indenyl)titanium dibromide, bis(cyclopentadienyl)titanium dimethyl, bis(cyclopentadienyl)titanium diethyl, bis(cyclopentadienyl)titanium dimethanol, bis(indenyl) titanium dimethanol, bis(fluorenyl)titanium dimethanol, bis(cyclopentadienyl)titanium diethoxy, bis(cyclopentadienyl) titanium dibutoxy, bis(cyclopentadienyl)titanium diphenoxy, bis(cyclopentadienyl)titanium dibenzoxy, bis(cyclopentadienyl)titanium dicarboxy, or derivatives thereof. The derivative here indicates that there is a substituent on the indenyl, fluorenyl, or cyclopentadienyl ring, and the substituent can be one or more from methyl, methoxy, p-tert-butylphenyl, pentafluorophenyl, trifluorophenyl, difluorophenyl, or 3,5-(tert-butyl)-4-methoxyphenyl. A preferred example of hydrogenation catalyst (I) is bis(cyclopentadienyl)titanium dichloride.

The hydrogenation catalyst (II) of the present invention is represented by formula (II):

(II)

wherein

L is a Group IVB element,

R is $C_1$–$C_{12}$ alkyl or $C_1$–$C_{12}$ cycloalkyl, and

X can be the same or different and is $C_1$–$C_{12}$ alkyl, $C_1$–$C_{12}$ alkoxy, $C_1$–$C_{12}$ cycloalkoxy, halogen, or carbonyl.

According to a preferred embodiment of the present invention, in the hydrogenation catalyst (II), at least one X is $C_1$–$C_{12}$ alkoxy or $C_1$–$C_{12}$ cycloalkoxy. For example, two Xs are $C_1$–$C_{12}$ alkoxy or $C_1$–$C_{12}$ cycloalkoxy, and one X is halogen. Such represenatative examples include chlorotitanium tri-n-propoxide, chlorotitanium tri-isopropoxide, chlorotitanium tri-n-butoxide, chlorotitanium tri-isobutoxide, chlorotitanium tri-n-pentoxide, and chlorotitanium tri-isopentoxide. In addition, for example, in the hydrogenation catalyst (II), one X is $C_1$–$C_{12}$ alkoxy or $C_1$–$C_{12}$ cycloalkoxy, and two Xs are carboxy. Such representative examples include di(n-propoxide)bis(2,2,6,6-tetramethyl-3,5-heptane-dionato)titanium:

di(n-butoxide)bis(2,2,6,6-tetramethyl-3,5-heptane-dionato) titanium, and di(isopentoxide)bis(2,2,6,6-tetramethyl-3,5-heptane-dionato)titanium.

Moreover, in the hydrogenation catalyst (II), all three Xs can be $C_1$–$C_{12}$ alkoxy or $C_1$–$C_{12}$ cycloalkoxy. For example, the hydrogenation catalyst (II) can be titanium(IV) ($C_1$–$C_{12}$ alkoxide) or zirconium IV) ($C_1$–$C_{12}$ alkoxide). Representative examples include titanium(IV)n-ethoxide, titanium(IV) n-propoxide, titanium(IV)isopropoxide, titanium(IV)n-butoxide, titanium(IV)sec-butoxide, titanium(IV) isobutoxide, titanium(IV)n-pentoxide, titanium(IV) isopentoxide, titanium(IV)1-methylbutoxide, titanium(IV) 2-methylbutoxide, titanium(IV)1,2-dimethylpropoxide, titanium(IV)neopentoxide, titanium(IV)n-hexoxide, titanium(IV)isohexoxide, titanium(IV)1,1-dimethylbutoxide, titanium(IV)2,2-dimethylbutoxide, titanium(IV)3,3-dimethylbutoxide, titanium(IV)n-undecoxide, titanium(IV)n-dodecoxide, zirconium(IV)n-ethoxide, zirconium(IV)n-propoxide, zirconium(IV) isopropoxide, zirconium(IV)n-butoxide, zirconium(IV)sec-butoxide, and zirconium(IV)isobutoxide.

When L in the hydrogenation catalyst (II) is titanium, in addition to the above-mentioned titanium compounds, representative examples of the hydrogenation catalyst (II) further include titanium(IV) 1-methylpentoxide, titanium(IV) 2-methylpentoxide, titanium(IV) 3-methylpentoxide, titanium(IV) 1,2-dimethylbutoxide, titanium(IV) 1,3-dimethylbutoxide, titanium(IV) 1-ethylbutoxide, titanium (IV) 2-ethylbutoxide, titanium(IV) cyclohexoxide, titanium (IV) n-heptoxide, titanium(IV) isoheptoxide, titanium(IV) 4-methylhexoxide, titanium(IV) 3-methylhexoxide, titanium(IV) 2-methylhexoxide, titanium(IV) 1-methylhexoxide, titanium(IV) 1-methylhexoxide, titanium(IV) 1,1-dimethylpentoxide, titanium(IV) 2,2-dimethylpentoxide, titanium(IV) 3,3-dimethylpentoxide, titanium(IV) 4,4-dimethylpentoxide, titanium(IV) 1,2-dimethylpentoxide, titanium(IV) 1,3-dimethylpentoxide, titanium(IV) 1,4-dimethylpentoxide, titanium(IV) 1-ethylpentoxide, titanium(IV) 1-propylpentoxide, titanium (IV) 2-ethylpentoxide, titanium(IV) 3-ethylpentoxide, titanium(IV) 1,1-ethylmethylbutoxide, titanium(IV) 1,1-diethylpropoxide, titanium(IV) 2,3-dimethylpentoxide, titanium(IV) 2,4-dimethylpentoxide, titanium(IV) 3,4-dimethylpentoxide, titanium(IV) 1-ethyl-3-methylbutoxide, titanium(IV) 4-methylcyclohexoxide, titanium(IV) 3-methylbutoxide, titanium(IV) 3-methylcyclohexoxide, titanium(IV) cycloheptoxide, titanium(IV) 1,1,2-trimethylbutoxide, titanium(IV) 1,1,3-trimethylbutoxide, titanium(IV) 2,2,1-trimethylbutoxide, titanium(IV) 2,2,3-trimethylbutoxide, titanium(IV) 3,3,1-trimethylbutoxide, titanium(IV) 3,3,2-trimethylbutoxide, titanium(IV) 1,1,2,2-tetramethylpropoxide, titanium(IV) n-octoxide, titanium (IV) 1-methylheptoxide, titanium(IV) 2-methylheptoxide, titanium(IV) 3-methylheptoxide, titanium(IV) 4-methylheptoxide, titanium(IV) 5-methylheptoxide, titanium(IV) isooctoxide, titanium(IV) 1-ethylhexoxide, titanium(IV) 2-ethylhexoxide, titanium(IV) 3-ethylhexoxide, titanium(IV) 4-ethylhexoxide, titanium (IV) 1,1-dimethylhexoxide, titanium(IV) 2,2-dimethylhexoxide, titanium(IV) 3,3-dimethylhexoxide, titanium(IV) 4,4-dimethylhexoxide, titanium(IV) 5,5-dimethylhexoxide, titanium(IV) 1,2-dimethylhexoxide, titanium(IV) 1,3-dimethylhexoxide, titanium(IV) 1,4-dimethylhexoxide, titanium(IV) 1,5-dimethylhexoxide, titanium(IV) 2,3-dimethylhexoxide, titanium(IV) 2,4-dimethylhexoxide, titanium(IV) 3,4-dimethylhexoxide, titanium(IV) 2,5-dimethylhexoxide, titanium(IV) 3,5-dimethylhexoxide, titanium(IV) 1,1-methylethylpentoxide, titanium(IV) 1-ethyl-2-methylpentoxide, titanium(IV) 1-ethyl-3-methylpentoxide, titanium(IV) 1-ethyl-4-methylpentoxide, titanium(IV) 2-ethyl-1-methylpentoxide, titanium(IV) 2,2-ethylmethylpentoxide, titanium(IV) 3,3-ethylmethylpentoxide, titanium(IV) 2-ethyl-3-methylpentoxide, titanium(IV) 2-ethyl-4-methylpentoxide, titanium(IV) 3-ethyl-4-methylpentoxide, titanium(IV) 3-ethyl-2-methylpentoxide, titanium (IV) 1,1-diethylbutoxide, titanium(IV) 2,2-diethylbutoxide, titanium (IV) 1,2-diethylbutoxide, titanium(IV) 1,1-methylpropylbutoxide, titanium(IV) 2-methyl-1-propylbutoxide, titanium (IV) 3-methyl-1-propylbutoxide, titanium (IV) 4-ethylcyclohexoxide, titanium(IV) 3-ethylcyclohexoxide, titanium(IV) 3,4-dimethylcyclohexoxide, titanium(IV) 1,1,2- trimethylpentoxide, titanium(IV) 1,1,3-trimethylpentoxide, titanium(IV) 1,1,4-trimethylpentoxide, titanium(IV) 2,2,1-trimethylpentoxide, titanium(IV) 2,2,3-trimethylpentoxide, titanium(IV) 2,2,4-trimethylpentoxide, titanium(IV) 3,3,1-trimethylpentoxide, titanium(IV) 3,3,2-trimethylpentoxide, titanium(IV) 3,3,4-trimethylpentoxide, titanium(IV) 1,2,3-trimethylpentoxide, titanium(IV) 1,2,4-trimethylpentoxide, titanium(IV) 1,3,4-trimethylpentoxide, titanium(IV) 1,2,3-trimethylpentoxide, titanium(IV) 1,2,4-trimethylpentoxide, titanium(IV) 1,3,4-trimethylpentoxide, titanium(IV) 1,1,2,2-tetramethylbutoxide, titanium(IV) 1,1,3,3-tetramethylbutoxide, titanium(IV) 1,1,2,3-tetramethylbutoxide, titanium(IV) 2,2,1,3-tetramethylbutoxide, titanium(IV) 1-ethyl-1,2-dimethylbutoxide, titanium(IV) 1-ethyl-2,3-dimethylbutoxide, titanium(IV) n-nonoxide, titanium(IV) isononoxide, titanium(IV) 1-methyloctoxide, titanium(IV) 2-methyloctoxide, titanium(IV) 3-methyloctoxide, titanium(IV) 4-methyloctoxide, titanium(IV) 5-methyloctoxide, titanium(IV) 6-methyloctoxide, titanium(IV) 1-ethylheptoxide, titanium(IV) 2-ethylheptoxide, titanium(IV) 3-ethylheptoxide, titanium(IV) 4-ethylheptoxide, titanium(IV) 5-ethylheptoxide, titanium(IV) 1,1-dimethylheptoxide, titanium(IV) 2,2-dimethylheptoxide, titanium(IV) 3,3-dimethylheptoxide, titanium(IV) 4,4-dimethylheptoxide, titanium(IV) 5,5-dimethylheptoxide, titanium(IV) 6,6-dimethylhexoxide, titanium(IV) 1,2-dimethylheptoxide, titanium(IV) 1,3-dimethylheptoxide, titanium(IV) 1,4-dimethylheptoxide, titanium(IV) 1,5-dimethylheptoxide, titanium(IV) 1,6-dimethylheptoxide, titanium(IV) 2,3-dimethylheptoxide, titanium(IV) 2,4-dimethylheptoxide, titanium(IV) 2,5-dimethylheptoxide, titanium(IV) 2,6-dimethylheptoxide, titanium(IV) 3,4-dimethylheptoxide, titanium(IV) 3,5-dimethylheptoxide, titanium(IV) 3,6-dimethylheptoxide, titanium(IV) 4,5-dimethylheptoxide, titanium(IV) 4,6-dimethylheptoxide, titanium(IV) 5,6-dimethylheptoxide, titanium(IV) 1,1,2-trimethylhexoxide, titanium(IV) 1,1,3-trimethylhexoxide, titanium(IV) 1,1,4-trimethylhexoxide, titanium(IV) 1,1,5-trimethylhexoxide, titanium(IV) 2,2,1-trimethylhexoxide, titanium(IV) 2,2,3-trimethylhexoxide, titanium(IV) 2,2,4-trimethylhexoxide, titanium(IV) 2,2,5-trimethylhexoxide, titanium(IV) 3,3,1-trimethylhexoxide, titanium(IV) 4,4,1-trimethylhexoxide, titanium(IV) 4,4,2-trimethylhexoxide, titanium(IV) 4,4,3-trimethylhexoxide, titanium(IV) 4,4,5-trimethylhexoxide, titanium(IV) 2,3,4-trimethylhexoxide, titanium(IV) 3,4,5-trimethylhexoxide, titanium(IV) 1,3,4-trimethylhexoxide, titanium(IV) 1,4,5-trimethylhexoxide, titanium(IV) 2,4,5-trimethylhexoxide, titanium(IV) 1,2,5-trimethylhexoxide, titanium(IV) 1,2,4-trimethylhexoxide, titanium(IV) n-decoxide, titanium(IV) isodecoxide, titanium(IV) 1-methylnonoxide, titanium(IV) 2-methylnonoxide, titanium(IV) 3-methylnonoxide, titanium(IV) 4-methylnonoxide, titanium(IV) 5-methylnonoxide, titanium(IV) 6-methylnonoxide, titanium(IV) 7-methylnonoxide, titanium(IV) 1-ethyloctoxide, titanium(IV) 2-ethyloctoxide, titanium(IV) 3-ethyloctoxide, titanium(IV) 4-ethyloctoxide, titanium(IV) 5-ethyloctoxide, titanium(IV) 6-ethyloctoxide, titanium(IV) 1,1-dimethyloctoxide, titanium(IV) 2,2-dimethyloctoxide, titanium(IV) 3,3-dimethyloctoxide, titanium(IV) 4,4-dimethyloctoxide, titanium(IV) 5,5-dimethyloctoxide, titanium(IV) 6,6-dimethyloctoxide, titanium(IV) 7,7-dimethyloctoxide, titanium(IV) 1,2-dimethyloctoxide, titanium(IV) 1,3-dimethyloctoxide, titanium(IV) 1,4-dimethyloctoxide, titanium(IV) 1,5-dimethyloctoxide, titanium(IV) 1,6-dimethyloctoxide, titanium(IV) 1,7-dimethyloctoxide, titanium(IV) 2,3-dimethyloctoxide, titanium(IV) 2,4-dimethyloctoxide, titanium(IV) 2,5-dimethyloctoxide, titanium(IV) 2,6-dimethyloctoxide, titanium(IV) 2,7-dimethyloctoxide, titanium(IV) 3,4-dimethyloctoxide, titanium(IV) 3,5-dimethyloctoxide, titanium(IV) 3,6-dimethyloctoxide, titanium(IV) 3,7-dimethyloctoxide, titanium(IV) 4,5-dimethyloctoxide, titanium(IV) 4,6-dimethyloctoxide, titanium(IV) 4,7-dimethyloctoxide, titanium(IV) 5,6-dimethyloctoxide, titanium(IV) 5,7-dimethyloctoxide, chlorotitanium tri-n-hexoxide, chlorotitanium triisohexoxide, chlorotitanium triisopropoxide, chlorotianium tri-n-butoxide, chlorotitanium triisobutoxide, chlorotitanium tri(1-methylbutoxide), chlorotitanium tri-n-pentoxide, chlorotitanium triisopentoxide, chlorotitanium tri(2-methylbutoxide), chlorotitanium tri(1,2-dimethylpropoxide), chlorotitanium tri-neo-pentoxide, chlorotitanium tri-n-hexoxide, chlorotitanium triisohexoxide, chlorotitanium tri(1,1-dimethylbutoxide), chlorotitanium tri(2,2-dimethylbutoxide), chlorotitanium tri(3,3-dimethylbutoxide), chlorotitanium tri(1-ethylbutoxide), chlorotitanium tri(2-ethylbutoxide), chlorotitanium tricyclohexoxide, chlorotitanium tri-n-heptoxide, chlorotitanium triisoheptoxide, chlorotitanium tri(1,1-dimethylpentoxide), chlorotitanium tri(2,2-dimethylpentoxide), chlorotitanium tri(3,3-dimethylpentoxide), and chlorotitanium tri(4,4-dimethylpentoxide).

When L in the hydrogenation catalyst (II) is zirconium, representative examples of such zirconium compounds include zirconium(IV) n-ethoxide, zirconium(IV) n-propoxide, zirconium(IV) n-pentoxide, zirconium(IV) isopentoxide, zirconium(IV) 1-methylbutoxide, zirconium (IV) 2-methylbutoxide, zirconium(IV) 1,2-dimethylpropoxide, zirconium(IV) neopentoxide, zirconium (IV) n-hexoxide, zirconium(IV) isohexoxide, zirconium(IV) 1-methylpentoxide, zirconium(IV) 2-methylpentoxide, zirconium(IV) 3-methylpentoxide, zirconium(IV) 1,1-dimethylbutoxide, zirconium(IV) 2,2-dimethylbutoxide, zirconium(IV) 3,3-dimethylbutoxide, zirconium(IV) 1,2-dimethylbutoxide, zirconium(IV) 1,3-dimethylbutoxide, zirconium(IV) 1-ethylbutoxide, zirconium(IV) 2-ethylbutoxide, zirconium(IV) cyclohexoxide, zirconium (IV) isopropoxide, zirconium(IV) n-butoxide, zirconium (IV) sec-butoxide, zirconium(IV) isobutoxide, zirconium (IV) n-pentoxide, zirconium(IV) isopentoxide, and zirconium(IV) 1-methylbutoxide.

In order for the unsaturated double bonds in the conjugated diene unit of the conjugated diene polymer to have high hydrogenation conversion, preferred selections of the hydrogenation catalyst (II) are titanium(IV) n-ethoxide, titanium(IV) n-propoxide, titanium(IV) isopropoxide, titanium(IV) n-butoxide, titanium(IV) sec-butoxide, titanium(IV) isobutoxide, chlorotitanium tri-n-propoxide, and zirconium(IV) n-butoxide.

The hydrogenation catalyst (III) of the present invention is a trialkylaluminum compound represented by formula (III):

$$AlR_3 \qquad (III)$$

wherein R can be the same or different and is $C_1$–$C_{12}$ alkyl or $C_6$–$C_{12}$ aryl.

Representative examples of the hydrogenation catalyst (III) includes trimethyl aluminum, triethyl aluminum, tri-n-propyl aluminum, triisopropyl aluminum, tributyl aluminum, tri-sec-butyl aluminum, triisobutyl aluminum, tri-n-pentyl aluminum, triisopentyl aluminum, tri-n-hexyl aluminum, triisohexyl aluminum, tri(1-methylpentyl)

aluminum, tri(2,5-dimethyloctyl)aluminum, tri(2,6-dimethyloctyl)aluminum, and triphenyl aluminum. Preferred selections include triethyl aluminum, triisopropyl aluminuim, tributyl aluminuim, and triisobutyl aluminum, most preferably triisobutyl aluminum.

The hydrogenation of the present invention involves bringing the conjugated diene polymer in an inert organic solvent into contact with hydrogen in the presence of a hydrogenation catalyst composition of the present invention. Thus, the unsaturated double bonds in the conjugated diene units of the conjugated diene polymer are selectively hydrogenated. The hydrogenation catalyst composition of the present invention includes hydrogenation catalysts (I), (II), and (III) as mentioned above. Specifically, for example, gaseous hydrogen is introduced into the conjugated diene polymer. Then, stirring is conducted to completely contact the hydrogen and conjugated diene polymer. Hydrogenation can be conducted by a batch or continuous methods.

The addition manner of the hydrogenation catalysts (I), (II), and (III) is not limited. For example, catalyst (II) can be first added to the polymer solution, and then a mixed solution of catalysts (I) and (III) are added. Alternatively, catalyst (II) can be first added to the polymer solution, followed by a catalyst (I) solution and a catalyst (III) solution, respectively. After all the catalysts are added to the polymer, the polymer is kept at inert gas atmosphere. The catalyst composition still has relatively good activity even after storage for a long time. Therefore, the catalyst composition of the present invention is very suitable for the requirement of industrial mass production.

According to the present invention, the inert organic solvent to dissolve the hydrogenation catalysts and the conjugated diene polymer can be a linear or branched hydrocarbon compound such as pentane, hexane, heptane, octane, and the like; or a cyclic hydrocarbon compound such as cyclohexane, cycloheptane, and methylheptane. Cyclohexane is the most suitable example. Alternatively, the inert organic solvent can be aromatic hydrocarbon such as benzene, toluene, xylene, and ethylbenzene, but is limited to those in which the aromatic double bonds are not hydrogenated under the hydrogenation condition used in the present invention.

Preparation of catalysts (I), (II), and (III) should be conducted in inert gas and low water content. The inert gas refers to helium, neon, nitrogen, and the like, which will not participate in hydrogenation. Air, oxygen, or high water content atmosphere will oxidize or decompose the hydrogenation catalysts, causing reduced activity in catalysts. In the condition under which the catalyst is pre-mixed, the temperature is preferably room temperature and the mixing time is not too long. Also, after the catalyst is prepared, preferably, it is immediately added to the polymer solution to prevent side reactions.

According to the present invention, conjugated diene polymers to be used in the present invention are produced by any of the methods known in the art, such as, for example, anionic polymerization, cationic polymerization, free radical polymerization, complex polymerization, solution polymerization, and emulsion polymerization. The conjugated diene polymer can have a number average molecular weight of 1000 to 1000000. It is preferable to use an organic lithium compound to serve as a catalyst initiator, thus obtaining a living polymer. The living polymer contains a lithium atom at the terminal end of the molecule chain. Therefore, when the monomer is added, polymerization can further proceed to lengthen the molecule chain. Examples of such organic lithium compounds are monolithium compounds such as n-propyl lithium, isopropyl lithium, tert-butyl lithium, n-pentyl lithium, phenyl lithium, or tolyl lithium, and dilithium compounds such as 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene. The amount of such organic lithium compound may be suitably selected depending on the desired molecular weight of the polymer. Generally, this amount is in the range of 0.05 to 5 wt % based on the total weight of all monomers used.

The term "conjugated diene polymer" as used in the present invention describes both a homopolymer and a copolymer of a conjugated diene. The copolymer of a conjugated diene can be random, block and graft copolymers of two or more conjugated dienes, or random, block and graft copolymers of at least one conjugated diene monomer and at least one vinyl aromatic hydrocarbon.

Conjugated diene monomer suitable for use in the present invention can be a conjugated diene having carbon atoms from 4 to 12. Representative examples include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene.

When the conjugated diene/vinyl aromatic hydrocarbon copolymer is hydrogenated, a high value thermoplastic elastomer is obtained. Aromatic hydrocarbon monomers suitable for use in the present invention include styrene, tert-butylstyrene, δ-methyl styrene, o-methyl styrene, p-methyl styrene, divinyl benzene, 1,1-diphenyl ethylene, vinyl naphthalene, N,N-dimethyl-p-aminoethylstyrene, and N,N-diethyl-p-aminoethylstyrene, preferably styrene. Representative examples of conjugated diene/vinyl aromatic hydrocarbon copolymer include butadiene/styrene copolymer and isoprene/styrene copolymer, since these copolymers after hydrogenation, have high industry value.

In addition, a tertiary amine compound or ether compound can be added to the conjugated diene polymer system in order to increase the vinyl structure content of the conjugated diene. Such compounds suitable for use include general tertiary amine compounds and tetrahydrofuran.

0.0001 to 50 mmole of the hydrogenation catalyst (I) based on 100 g of the conjugated diene polymer is sufficient. If more than 50 mmole is used, the hydrogenation result will not improve, loses economical efficiency, and the catalyst removal procedures will be more complicated. Preferably, the hydrogenation catalyst (I) is present in an amount of 0.002 to 1 mmole, most preferably 0.005 to 0.2 mmole based on 100 g of the conjugated diene polymer.

Preferably, the molar ratio of the hydrogenation catalyst (II) to the hydrogenation catalyst (I) is 0.1 to 50. If the molar ratio is less than 0.1, the hydrogenation catalyst cannot efficiently increase the hydrogenation activity, thus, hydrogenation stops and the ideal goal cannot be achieved. If the molar ratio is higher than 50, the catalyst must be removed and unnecessary secondary reaction easily occurs, which hinders the hydrogenation. Most preferably, the molar ratio of the hydrogenation catalyst (II) to the hydrogenation catalyst (I) is 2 to 15.

Preferably, the molar ratio of the hydrogenation catalyst (III) to the hydrogenation catalyst (I) is 0.1 to 50. If the molar ratio is less than 0.1, the catalyst (III) cannot activate the catalyst (I) and the hydrogenation conversion is poor. If the molar ratio is higher than 50, the hydrogenation rate can be enhanced at the initial stage, but at the middle stage, the unnecessary secondary products will rapidly decrease the hydrogenation conversion. Also, the catalyst must be removed, which makes the subsequent procedures more complicated. Preferably, the molar ratio of the hydrogenation catalyst (III) to the hydrogenation catalyst (I) is 2 to 15, most preferably 6 to 10.

The hydrogenation reaction of the present invention can be conducted at a temperature of 0° C. to 200° C. If the reaction temperature is lower than 0° C., the reaction rate is too low and the catalyst (I) amount must be increased, impacting economical efficiency. If the reaction temperature is higher than 200° C., the catalyst will be deactivated, thus decreasing the catalytic activity. Also, secondary reaction easily occurs, which in turn decomposes the polymer to form gel. Preferably, the hydrogenation temperature is 40° C. to 140° C.

The hydrogenation can be conducted at a hydrogen pressure of 0.1 kg/cm$^2$ to 100 kg/cm$^2$, preferably 1 to 90 kg/cm$^2$, more preferably 1 to 50 kg/cm$^2$, and most preferably 2 to 35 kg/cm$^2$. When the hydrogen pressure is less than 1 kg/cm$^2$, the reaction rate may be not obvious. When the hydrogen pressure is higher than 90 kg/cm$^2$, the hydrogenation will rapidly stop. The catalyst amount can be decreased by increasing the hydrogen pressure. In order to decrease the catalyst amount, it is preferable to conduct hydrogenation at higher hydrogen pressure.

According to the present invention, the hydrogenation time can be several seconds to 40 hours. Suitable range can be adjusted by the reaction conditions such as the ratio of the catalysts, hydrogen pressure, and hydrogenation temperature.

According to the present invention, the catalyst composition amount, hydrogen pressure, and hydrogenation temperature can be adjusted in order to achieve the desired hydrogenation conversion of double bonds in the conjugated diene polymer. Using the catalyst composition of the present invention to hydrogenate the conjugated diene/vinyl aromatic hydrocarbon copolymer, at least 50%, even at least 90%, even at least 95%, and even at least 97%, of the unsaturated double bonds in the conjugated diene units are hydrogenated. In contrast, lower than 10%, and even lower than 3%, of the aromatic ring (such as benzene ring) double bonds in the vinyl aromatic hydrocarbon units are hydrogenated. That is to say, the catalyst composition of the present invention has relatively good catalytic selectivity. The hydrogenation conversion for the conjugated diene units can be detected by IR spectrum analysis, and the hydrogenation conversion for the aromatic ring double bonds in the vinyl aromatic hydrocarbon units can be detected by UV spectrum analysis, which can be referred to U.S. Pat. No. 4,501,857.

The polymer solution obtained from hydrogenation using the hydrogenation catalyst composition of the present invention can be coagulated by adding a polar solvent. Such polar solvent is a poor solvent for the hydrogenated polymer, such as methanol or acetone. Or, alternatively, the hydrogenated polymer solution can be poured into hot water, stirred, and then distilled for separation. Or, the hydrogenated polymer solution can be directly heated to evaporate the solvent for separation.

According to the present invention, the conjugated diene polymer can be successfully hydrogenated using a small amount of a hydrogenation catalyst composition with relatively high activity. Since the catalyst composition concentration is very low, most catalyst is separated from the polymer or decomposes during the polymer separation procedure. Therefore, there is no need to wash or remove the catalyst from the hydrogenated polymer, greatly enhancing economic efficiency.

A feature of the catalyst composition of the present invention is that the catalyst (II) itself has the ability to hydrogenate conjugated diene polymer. The catalyst (II) can combine with other catalysts to stabilize other catalysts and enhance the catalytic activity thereof. Therefore, when the catalyst composition of the present invention is added to the conjugated diene polymer, it can be stored for 4 to 5 days in inert gas atmosphere, still maintaining good catalytic activity and reproducibility. Another feature is that the catalyst composition of the present invention has high hydrogenation activity over a wide range of temperatures and pressures. In addition, the catalyst composition of the present invention is resistant to high temperature and will not lose the catalytic activity due to high hydrogenation reaction heat. Therefore, it is very suitable for continuous production.

The following examples are intended to demonstrate this invention more fully without limiting its scope, since numerous modifications and variations will be apparent to those skilled in the art.

EXAMPLE 1

Preparation of SBS Copolymer 5400 g of cyclohexane, 7.4 mmole of n-butyl lithium, and 252 mmole of tetrahydrofuran (THF) were charged in 10 L of a heater equipped with a stirrer. Then, 96 g of styrene was added and the polymerization was conducted at 45° C. Then, 400 g of 1,3-butadiene and 96 g of styrene were added to the reaction system and the reaction mixture was further polymerized to an SBS (styrene-butadiene-styrene) tri-block copolymer (solid content=9.7%, Mw=230,000).

EXAMPLE 2

1000 g of the polymer solution of SBS tri-block copolymer prepared from Example 1 was transferred to a pressure-resistant hydrogenation vessel and maintained in nitrogen atmosphere. 0.11 mmole of titanium(IV) isopropoxide was dissolved in 10 ml of cyclohexane at room temperature, 0.11 mmole of titanium(IV) isopropoxide and 0.16 mmole of n-butyl lithium were mixed in 10 ml of cyclohexane in a glove box, and 0.055 mmole of bis(cyclopentadienyl) titanium dichloride and 0.33 mmole of triisobutyl aluminum were mixed in 20 ml of cyclohexane. The above solutions were added to the SBS copolymer. Hydrogen was fed in under a pressure of 25 kg/cm$^2$ to undergo hydrogenation at 80° C.

Figure 1:
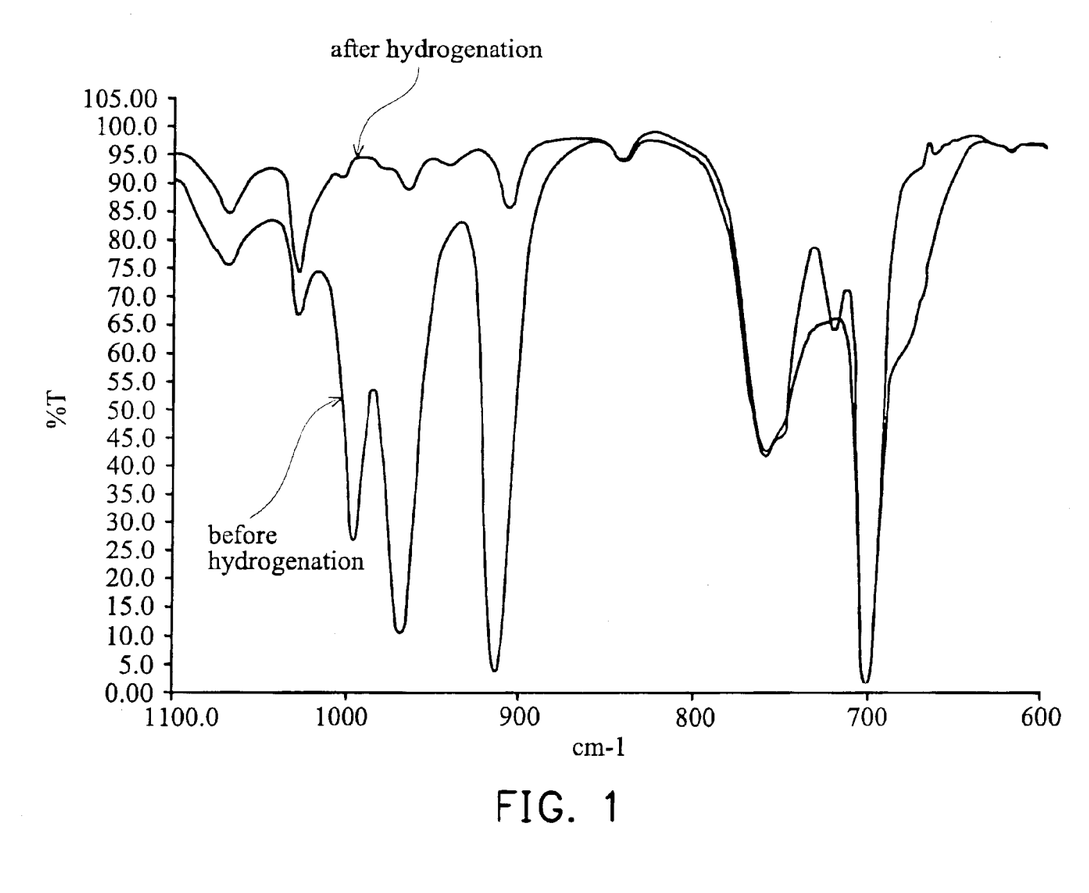
FIG. 1 shows IR spectrum of the SBS copolymer of Example 2 of the present invention before and after hydrogenation.

FIG. 1 shows IR spectra of the SBS copolymer before and after hydrogenation. It can be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 1 hour of hydrogenation, it can be seen that the above peaks disappear obviously, the hydrogenation conversion (the hydrogenation conversion of the unsaturated double bond of the 1,3-butadiene unit) was measured to 97%. The hydrogenation data are summarized in Table 1.

EXAMPLE 3

1000 g of the polymer solution of SBS tri-block copolymer prepared from Example 1 was transferred to a pressure-resistant hydrogenation vessel and maintained in nitrogen atmosphere. 0.11 mmole of titanium(IV) isopropoxide was dissolved in 10 ml of cyclohexane at room temperature, 0.055 mmole of bis(cyclopentadienyl)titanium dichloride was dissolved in 10 ml of cyclohexane, and 0.33 mmole of triisobutyl aluminum was dissolved in 10 ml of cyclohexane. The above solutions were added to the SBS copolymer.

Hydrogen was fed in under a pressure of 25 kg/cm² to undergo hydrogenation at 80° C. The 1,3-butadiene hydrogenation conversion was measured to reach 76% after 30 minutes and reach 97% after 1 hour. The hydrogenation data are summarized in Table 1.

EXAMPLE 4

1000 g of the polymer solution of SBS tri-block copolymer prepared from Example 1 was transferred to a pressure-resistant hydrogenation vessel and maintained in nitrogen atmosphere. 0.11 mmole of titanium(IV) isopropoxide was dissolved in 10 ml of cyclohexane at room temperature, 0.055 mmole of bis(cyclopentadienyl)titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 85% after 30 minutes and reach 98% after 1 hour. The hydrogenation data are summarized in Table 1.

EXAMPLE 5

The same procedures described in Example 3 were repeated except that titanium(IV) isopropoxide was changed to 0.165 mmole of titanium(IV) isobutoxide dissolved in 10 ml of cyclohexane. 0.055 mmole of bis(cyclopentadienyl) titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 90% after 30 minutes and reach 98% after 1 hour. The hydrogenation data are summarized in Table 1.

COMPARATIVE EXAMPLE 1

The same procedures described in Example 3 were repeated except that titanium(IV) isopropoxide was not added. 0.055 mmole of bis(cyclopentadienyl)titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C.

Figure 2:
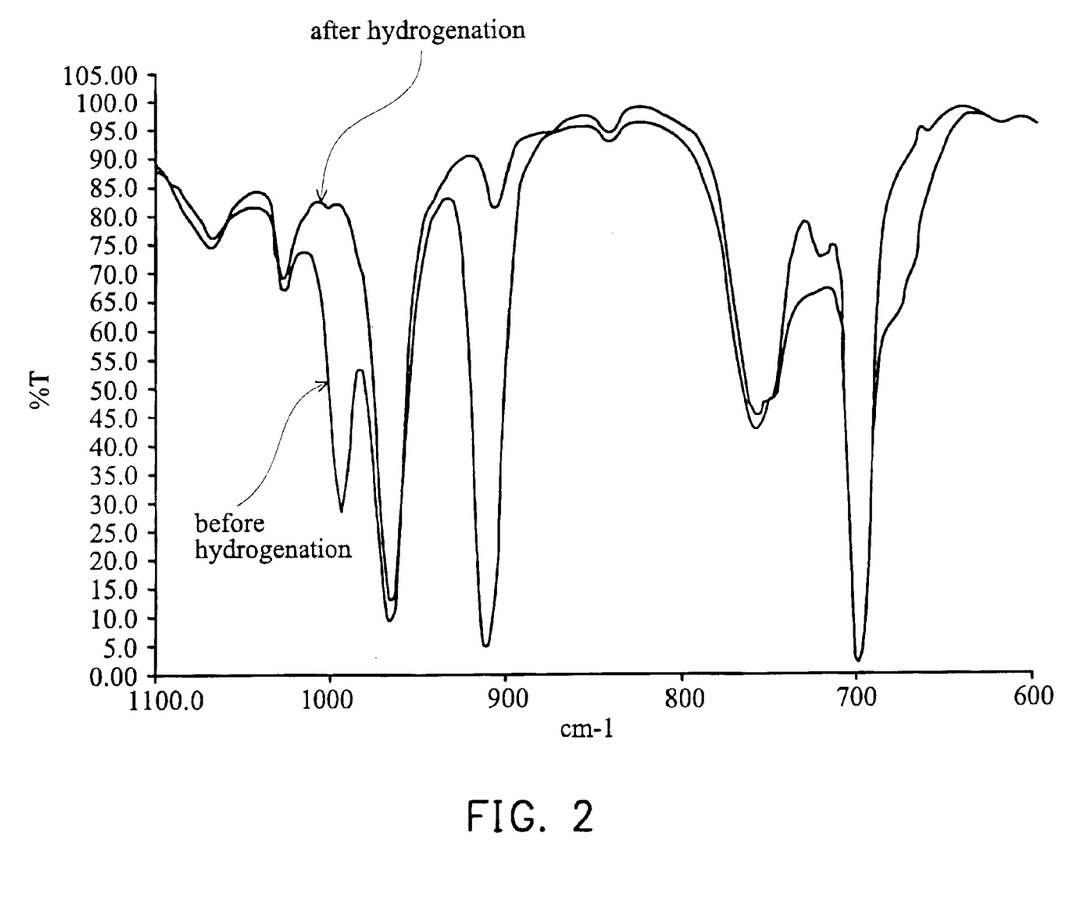
FIG. 2 shows IR spectrum of the SBS copolymer of Comparative Example 1 before and after hydrogenation.

FIG. 2 shows IR spectra of the SBS copolymer before and after hydrogenation. It can be seen that in the spectrum of the SBS tri-block copolymer before hydrogenation, the trans double bond is present at the wavelength peaks 968 cm⁻¹ and 995 cm⁻¹ and the 1,2-vinyl group double bond is present at the wavelength peak 912 cm⁻¹. After 1 hour of hydrogenation, it can be seen that the 995 cm⁻¹ and 912 cm⁻¹ peaks have decreased absorption, but the absorption of 968 cm⁻¹ peak has almost no change. At that time, the 1,3-butadiene hydrogenation conversion was measured to 23%. The hydrogenation data are summarized in Table 1.

COMPARATIVE EXAMPLE 2

1000 g of the polymer solution of SBS tri-block copolymer prepared from Example 1 was transferred to a pressure-resistant hydrogenation vessel. The SBS copolymer was fed with hydrogen and stirred for 30 minutes. The same procedures described in Example 3 were repeated except that titanium(IV) isopropoxide was changed to 0.22 mmole of n-butyl lithium. 0.055 mmole of bis(cyclopentadienyl) titanium dichloride was dispersed in 10 ml of cyclohexane, and 0.44 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 15% after 30 minutes and reach 24% after 1 hour. The hydrogenation data are summarized in Table 1.

EXAMPLE 6

The same procedures described in Example 3 were repeated except that titanium(IV) isopropoxide was changed to 0.2 mmole of titanium(IV) n-dodecoxide dissolved in 10 ml of cyclohexane. 0.055 mmole of bis(cyclopentadienyl) titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 65% after 30 minutes and reach 95% after 1.5 hours. The hydrogenation data are summarized in Table 1.

EXAMPLE 7

The same procedures described in Example 3 were repeated except that titanium(IV) isopropoxide was changed to 0.2 mmole of chlorotitanium tri-n-propoxide dissolved in 10 ml of cyclohexane. 0.055 mmole of bis (cyclopentadienyl) titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 65% after 30 minutes, 86% after 1 hour, and 95% after 1.5 hours. The hydrogenation data are summarized in Table 1.

EXAMPLE 8

The same procedures described in Example 3 were repeated except that titanium(IV) isopropoxide was changed to 0.275 mmole of di(n-propoxide)bis(2,2,6,6-tetramethyl-3,5-heptane-dionato)titanium dissolved in 10 ml of cyclohexane. 0.055 mmole of bis(cyclopentadienyl)titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 65% after 30 minutes, 76% after 1 hour, and 95% after 2 hours. The hydrogenation data are summarized in Table 1.

EXAMPLE 9

The same procedures described in Example 3 were repeated except that titanium(IV) isopropoxide was changed to 0.25 mmole of zirconium(IV) isobutoxide dissolved in 10 ml of cyclohexane. 0.055 mmole of bis(cyclopentadienyl) titanium dichloride was dispersed in 10 ml of cyclohexane, and 0.33 mmole of triisobutyl aluminum was dissolved in 10 ml of cyclohexane. The above solutions were added to the SBS copolymer. Hydrogen was fed in under a pressure of 25 kg/cm² to undergo hydrogenation at 80° C. The 1,3-butadiene hydrogenation conversion was measured to reach 65% after 30 minutes, 86% after 1 hour, and 95% after 1.5 hours. The hydrogenation data are summarized in Table 1.

TABLE 1

| Example | Residual trans double bonds (%) | Residual 1,2-vinyl bond (%) | 1,3-butadiene hydrogenation conversion (%) | benzene ring hydrogenation conversion (%) |
| --- | --- | --- | --- | --- |
| Example 2 | 2.7 | 0.3 | 97 | <1 |
| Example 3 | 2.6 | 0.4 | 97 | <1 |
| Example 4 | 1.5 | 0.5 | 98 | <1 |
| Example 5 | 1.7 | 0.3 | 98 | <1 |
| Example 6 | 4.3 | 0.7 | 95 | <1 |
| Example 7 | 4.2 | 0.8 | 95 | <1 |
| Example 8 | 4.8 | 0.2 | 95 | <1 |
| Example 9 | 2.4 | 0.6 | 95 | <1 |
| Comp. Ex. 1 | 75.5 | 1.5 | 23 | <1 |
| Comp. Ex. 2 | 74.4 | 1.6 | 24 | <1 |

TABLE 2

| Example | Hydrogenation Temp (° C.) | Hydrogenation pressure (kg/cm$^2$) | Reaction time (hr) | 1,3-butadiene hydrogenation conversion (%) |
| --- | --- | --- | --- | --- |
| Example 10 | 60 | 10 | 1 | 65 |
| Example 11 | 60 | 10 | 3 | 95 |
| Example 12 | 80 | 10 | 0.75 | 97 |
| Example 13 | 80 | 25 | 0.5 | 97 |
| Example 14 | 95 | 10 | 0.5 | 97 |
| Example 15 | 95 | 25 | 0.5 | 97 |

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for hydrogenation of a conjugated diene polymer, the conjugated diene polymer being a homopolymer or copolymer of a conjugated diene, the process comprising bringing the conjugated diene polymer in an inert organic solvent into contact with hydrogen in the presence of a hydrogenation catalyst composition to selectively hydrogenate the unsaturated double bonds in the conjugated diene units of the conjugated diene polymer, wherein the hydrogenation catalyst composition includes the following hydrogenation catalysts:

(I) a titanium compound represented by formula (I):

(I)

wherein $R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —CH$_2$P(phenyl)$_2$, —CH$_2$Si(C$_1$–C$_5$ alkyl)$_3$ or —P (phenyl)$_2$, and Cp* indicates cyclopendienyl, indenyl, fluorenyl, or derivatives thereof;

(II) a compound represented by formula (II):

(II)

wherein

L is a Group IVB element,

R is $C_1$–$C_{12}$ alkyl or $C_1$–$C_{12}$ cycloalkyl,

X can be the same or different and is $C_1$–$C_{12}$ alkyl, $C_1$–$C_{12}$ alkoxy, $C_1$–$C_{12}$ cycloalkoxy, halogen, or carbonyl; and (III) a trialkylaluminum compound represented by formula (III):

AlR$_3$ (III)

wherein R can be the same or different and is $C_1$–$C_{12}$ alkyl or $C_6$–$C_{12}$ aryl, wherein the molar ratio of the hydrogenation catalyst (II) to the hydrogenation catalyst (I) is 0.1 to 50, the molar ratio of the hydrogenation catalyst (III) to the hydrogenation catalyst (I) is 0.1 to 50, the hydrogenation catalyst (I) is present in an amount of 0.0001 to 50 mmole based on 100 g of the conjugated diene polymer, and the hydrogenation reaction is conducted at a temperature of 0° C. to 200° C. at a hydrogen pressure of 0.1 kg/cm$^2$ to 100 kg/cm$^2$.

2. The process as claimed in claim 1, wherein the hydrogenation catalyst (I) is bis(cyclopentadienyl)titanium dichloride, bis(1-fluorenyl)titanium dichloride, bis(1-indenyl)titanium dichloride, bis(1-fluorenyl)titanium dibromide, bis(1-indenyl)titanium dibromide, bis(cyclopentadienyl)titanium dimethyl, bis(cyclopentadienyl) titanium diethyl, bis(cyclopentadienyl)titanium dimethanol, bis(indenyl)titanium diniethanol, bis(fluorenyl)titanium dimethanol, bis(cyclopentadienyl)titanium diethoxy, bis (cyclopentadienyl)titanium dibutoxy, bis(cyclopentadienyl) titanium diphenoxy, bis(cyclopentadienyl)titanium dibenzoxy, bis(cyclopentadienyl)titanium dicarboxy, or derivatives thereof.

3. The process as claimed in claim 2, wherein the hydrogenation catalyst (I) is bis(cyclopentadienyl)titanium dichioride.

4. The process as claimed in claim 1, wherein in the hydrogenation catalyst (II), at least one X is $C_1$–$C_{12}$ alkoxy or $C_1$–$C_{12}$ cycloalkoxy.

5. The process as claimed in claim 4, wherein in the hydrogenation catalyst (II), two X are $C_1$–$C_{12}$ alkoxy or $C_1$–$C_{12}$ cycloalkoxy, and one X is halogen.

6. The process as claimed in claim 5, wherein the hydrogenation catalyst (II) is chlorotitanium tri-n-propoxide, chlorotitanium tri-isopropoxide, chlorotitanium tri-n-butoxide, chlorotitanium tri-isobutoxide, chlorotitanium tri-n-pentoxide, or chlorotitanium tri-isopentoxide.

7. The process as claimed in claim 4, wherein in the hydrogenation catalyst (II), one X is $C_1$–$C_{12}$ alkoxy or $C_1$–$C_{12}$ cycloalkoxy, and two X are carboxy.

8. The process as claimed in claim 7, wherein the hydrogenation catalyst (II) is di(n-propoxide)bis(2,2,6,6- tetramethyl-3,5-heptane-dionato)titanium, di(n-butoxide)bis (2,2,6,6-tetramethyl-3,5-heptane-dionato)titanium, or di(isopentoxide)bis(2,2,6,6- tetramethyl-3,5-heptane dionato)titanium.

9. The process as claimed in claim 4, wherein in the hydrogenation catalyst (II), three X are $C_1$–$C_{12}$ alkoxy or $C_1$–$C_{12}$ cycloalkoxy.

10. The process as claimed in claim 9, wherein the hydrogenation catalyst (II) is titanium(IV) tetra($C_1$–$C_{12}$ alkoxide) or zirconium(IV) tetra($C_1$–$C_{12}$ alkoxide).

11. The process as claimed in claim 10, wherein the hydrogenation catalyst (II) is titanium(IV) tetra(n-ethoxide), titanium(IV) tetra(n-propoxide), titanium(IV) tetra (isopropoxide), titanium(IV) tetra(n-butoxide), titanium(IV) tetra(sec-butoxide), titanium(IV) tetra(isobutoxide), titanium(IV) tetra(n-pentoxide), titanium(IV) tetra (isopentoxide), titanium(IV) tetra(1-methylbutoxide), titanium(IV) tetra(2-methylbutoxide), titanium(IV) tetra(1, 2-dimethylpropoxide), titanium(IV) tetra(neopentoxide), titanium(IV) tetra(n-hexoxide), titanium(IV) tetra (isohexoxide), titanium(IV) tetra(1,1-dimethylbutoxide), titanium(IV) tetra(2,2-dimethylbutoxide), titanium(IV) tetra (3,3-dimethylbutoxide), titanium(IV) tetra(n-undecoxide), titanium(IV) tetra(n-dodecoxide), zirconium(IV) tetra(n-ethoxide), zirconium(IV) tetra(n-propoxide), zirconium(IV) tetra(isopropoxide), zirconium(IV) tetra(n-butoxide, zirconium(IV) tetra(sec-butoxide), or zirconium(IV) tetra (isobutoxide).

12. The process as claimed in claim 1, wherein the hydrogenation catalyst (III) is trimethyl aluminum, triethyl aluminum, tri-n-propyl aluminum, triisopropyl aluminum, tributyl aluminum, tri-sec-butyl aluminum, triisobutyl aluminum, tri-n-pentyl aluminum, triisopentyl aluminum, tri-n-hexyl aluminum, triisohexyl aluminum, tri(1-methylpentyl) aluminum, tri(2,5-dimethyloctyl) aluminum, tri(2,6-dimethyloctyl) aluminum, or triphenyl aluminum.

13. The process as claimed in claim 12, wherein the hydrogenation catalyst (III) is triisobutyl aluminum.

14. The process as claimed in claim 1, wherein the hydrogenation catalyst (I) is present in an amount of 0.005 to 0.2 mmole based on 100 g of the conjugated diene polymer.

15. The process as claimed in claim 1, wherein the molar ratio of the hydrogenation catalyst (II) to the hydrogenation catalyst (I) is between 2 and 15.

16. The process as claimed in claim 1, wherein the molar ratio of the hydrogenation catalyst (III) to the hydrogenation catalyst (I) is between 2 and 15.

17. The process as claimed in claim 1, wherein the conjugated diene polymer has a number average molecular weight of 1000 to 1000000.

18. The process as claimed in claim 1, wherein the conjugated diene polymer is a conjugated diene/vinyl aromatic hydrocarbon copolymer.

19. The process as claimed in claim 1, wherein the hydrogenation is conducted at a temperature of 40° C. to 140° C. and at a hydrogen pressure of 1 to 50 kg/cm².

20. The process as claimed in claim 18, wherein at least 50% of the unsaturated double bonds in the conjugated diene units are hydrogenated.

21. The process as claimed in claim 20, wherein at least 90% of the unsaturated double bonds in the conjugated diene units are hydrogenated.

22. The process as claimed in claim 18, wherein lower than 10% of the aromatic ring double bonds in the vinyl aromatic hydrocarbon units are hydrogenated.

23. The process as claimed in claim 22, wherein lower than 3% of the aromatic ring double bonds in the vinyl aromatic hydrocarbon units are hydrogenated.

24. A hydrogenation catalyst composition comprising the following hydrogenation catalysts:

(I) a titanium compound represented by fonnula(I):

wherein
$R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2$, —$CH_2Si$ ($C_1$–$C_5$ alkyl)$_3$, or —$P(phenyl)_2$, and Cp* indicates cyclopendienyl, indenyl, fluorenyl, or derivatives thereof;

(II) a compound represented by formula (II):

wherein
L is a Group IVB element,
R is $C_1$–$C_{12}$ alkyl or $C_1$–$C_{12}$ cycloalkyl,
X can be the same or different and is $C_1$–$C_{12}$ alkyl, $C_1$–$C_{12}$ alkoxy, $C_1$–$C_{12}$ cycloalkoxy, halogen, or carbonyl; and (III) a trialkylaluminum compound represented by formula (Ill):

wherein R can be the same or different and is $C_1$–$C_{12}$ alkyl or $C_6$–$C_{12}$ aryl, wherein the molar ratio of the hydrogenation catalyst (II) to the hydrogenation catalyst (I) is 0.1 to 50, the molar ratio of the hydrogenation catalyst (III) to the hydrogenation catalyst (I) is 0.1 to 50.

* * * * *